(12) United States Patent
Asao et al.

(10) Patent No.: US 9,090,332 B2
(45) Date of Patent: Jul. 28, 2015

(54) NOISE REDUCTION DEVICE

(75) Inventors: Yoshifumi Asao, Hyogo (JP); Hiroyuki Kano, Hyogo (JP); Masaaki Higashida, Osaka (JP); Tsuyoshi Maeda, Hyogo (JP); Toshihiro Ezaki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 376 days.

(21) Appl. No.: 12/594,385

(22) PCT Filed: Dec. 11, 2008

(86) PCT No.: PCT/JP2008/003712
§ 371 (c)(1),
(2), (4) Date: Oct. 2, 2009

(87) PCT Pub. No.: WO2009/078147
PCT Pub. Date: Jun. 25, 2009

(65) Prior Publication Data
US 2010/0111317 A1    May 6, 2010

(30) Foreign Application Priority Data

Dec. 14, 2007    (JP) ................................. 2007-322788

(51) Int. Cl.
*G10K 11/16*    (2006.01)
*A61F 11/06*    (2006.01)
*H03B 29/00*    (2006.01)
(Continued)

(52) U.S. Cl.
CPC ............... *B64C 1/40* (2013.01); *B60R 13/0815* (2013.01); *G10K 11/178* (2013.01); *G10K 11/1788* (2013.01); *G10K 2210/1281* (2013.01); *G10K 2210/3221* (2013.01); *Y02T 50/46* (2013.01)

(58) Field of Classification Search
CPC ..... G10K 11/178–11/1788; G10K 2210/1281; G10K 2210/3221; B60R 13/0815; B64C 1/40; Y02T 50/46
USPC ...................... 381/71.1–71.14, 94.1–94.8, 86; 244/118.6; 297/184.14, 61, 391–410
See application file for complete search history.

(56) References Cited

U.S. PATENT DOCUMENTS 3,762,766 A * 10/1973 Barecki et al. ............. 297/217.1
5,133,017 A * 7/1992 Cain et al. .................. 381/71.6
(Continued)

FOREIGN PATENT DOCUMENTS

EP    1078852 A2    2/2001
JP    05-50495 U    7/1993
(Continued)

OTHER PUBLICATIONS

International Search Report for PCT/JP2008/003712.
(Continued)

*Primary Examiner* — Xu Mei
(74) *Attorney, Agent, or Firm* — Pearne & Gordon LLP

(57) ABSTRACT

A noise reduction device, including a microphone for detecting noise, a noise controller for reversing the phase of noise detected by the microphone based on information outputted from the microphone, and a speaker for outputting sound based on information outputted from the noise controller, is arranged at a seat surrounded by a shell portion having a cavity, wherein a speaker is disposed in the cavity of the shell portion.

9 Claims, 7 Drawing Sheets

(51) Int. Cl.
*B64C 1/40* (2006.01)
*B60R 13/08* (2006.01)
*G10K 11/178* (2006.01)

(56) References Cited

U.S. PATENT DOCUMENTS

| | | | |
|---|---|---|---|
| 5,526,292 A * | 6/1996 | Hodgson et al. | 700/280 |
| 7,523,888 B2 * | 4/2009 | Ferry et al. | 244/118.6 |
| 7,837,259 B2 * | 11/2010 | Staab et al. | 297/118 |
| 8,196,864 B2 * | 6/2012 | Ruiter et al. | 244/118.6 |
| 2001/0000639 A1 | 5/2001 | Park et al. | |
| 2001/0003962 A1 | 6/2001 | Park et al. | |
| 2001/0015566 A1 | 8/2001 | Park et al. | |
| 2002/0076059 A1 * | 6/2002 | Joynes | 381/71.6 |
| 2003/0085597 A1 * | 5/2003 | Ludeke et al. | 297/184.14 |
| 2008/0019536 A1 * | 1/2008 | Marrot | 381/71.4 |

FOREIGN PATENT DOCUMENTS

| | | |
|---|---|---|
| JP | 06-332475 A | 12/1994 |
| JP | 10-143166 A | 5/1998 |
| JP | 10-236397 A | 9/1998 |
| JP | 2001-138998 A | 5/2001 |
| JP | 2002-116764 A | 4/2002 |
| JP | 2006-166281 A | 6/2006 |
| WO | 2005/014395 A1 | 2/2005 |

OTHER PUBLICATIONS

Full Translation of JP 06-332475 A, which was previously cited in the IDS filed on Oct. 2, 2009.

Full Translation of JP2002-116764 A, which was previously cited in the IDS filed on Oct. 2, 2009.

* cited by examiner

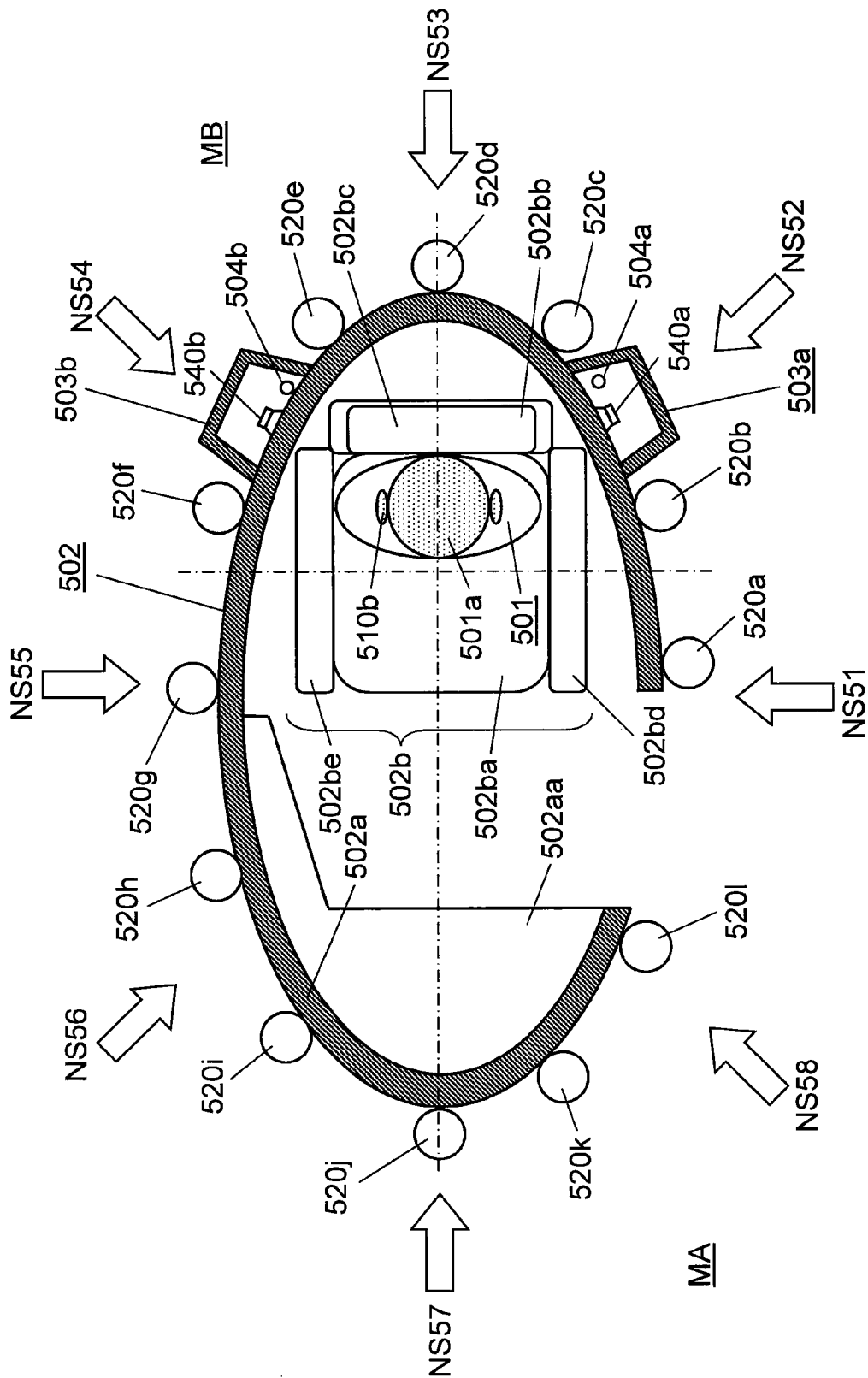

NOISE REDUCTION DEVICE

THIS APPLICATION IS A U.S. NATIONAL PHASE APPLICATION OF PCT INTERNATIONAL APPLICATION PCT/JP2008/003712.

TECHNICAL FIELD

The present invention relates to a noise reduction device in a seat, and particularly, it relates to a noise reduction device to be used in a closed structure such as airplane and train.

BACKGROUND ART

In airplanes and trains which generate considerable noise, when information is offered by voice service to the users, problems arise with noise generated at the seats.

In use of an inside space whose boundary is formed by a continuous wall as in an airplane or a train, the place used is a kind of closed structure, and if noise sources exist inside and outside the place used, it will cause a noise environment to be fixed for the users. As a result, although it depends upon the level of noise, the noise exerts physical and mental pressure upon the user, worsening the comfortability of the place used. Particularly, in the case of offering a service to the passengers in the cabin of an airplane, worsening of the comfortability will give serious hindrance to the quality of service operation.

Particularly, in the case of an airplane, main noise sources include noise generated from machines such as propellers and engines for producing thrust forces of the airplane, and sound of air current generated as the airplane body moves in the air such as sound generated by end portions or both wings of the airplane flying through the air. In this case, inside noise makes the passengers feel uncomfortable and also causes hindrance to the voice service. Accordingly, the situation is strongly desired to be improved.

On the other hand, as a measure for reducing noise in a closed room, conventionally, a method using a passive attenuation means is commonly employed. In the conventional method, a sound insulation material having acoustic absorptivity such as partition wall material or absorptive material is arranged between the closed structure and the noise generating source. A high-density partition wall material is used as partition wall material, and a sound absorbing sheet is used as absorptive material. A material having acoustic absorptivity is generally high-density, and such a high-density material increases in weight. As the weight increases, it causes the flying fuel to increase, and the flying distance to shorten. Accordingly, it results in worsening of the economy and function as an airplane. Also, as a structural material, lowering of the strength such as being easy to be damaged and worsening of the design function such as quality of the touch cannot be ignored.

In order to solve the problem involved in the measure for noise by using a passive attenuation means, as a method of reducing noise by using an active attenuation means, a conventional method of generating sound wave having a phase opposite to the phase of noise is generally executed. By using this method, it is possible to lower the noise level at the noise source or in the vicinity thereof in order to prevent the noise from being propagated to regions required to be reduced in noise. As a specific example, an audio-erasing device has been proposed, comprising a microphone for detecting sound generated from noise sources, a controller which amplifies the electric signal input from the microphone and reverses the phase, and a speaker which converts the electric signal input from the controller to sound and transmits the sound.

Also, recently examined is a method of executing measures for noise from the viewpoint of improving the comfortability at passenger seats, which is based on a method of reducing noise by using the above-mentioned active attenuation means. For example, those proposed include a method of disposing a noise reducing device in each seat and installing a speaker, microphone and controller in the vicinity of the seat, and a method of increasing the noise reducing effect for the user by disposing a plurality of speakers and microphones in the vicinity of the user at the seat. In this case, it is necessary to take into account the positions of the speaker and microphone arranged with respect to the hearing conditions such as the user's posture, and the effect of noise reduction greatly depend upon the positions. Particularly, the speaker emitting the control sound for reducing noise must be disposed in a position close to the user's ear, and conventional method proposed is a method of correcting the positional relation between the user's ear and the speaker by changing the tilt angle and position of the speaker (e.g. refer to Patent documents 1, 2). Regarding the speaker arrangement to the user, adjustments of the acoustic device are studied in various ways, and for example, a method of correcting the positional relation between the user and the speaker by shifting the speaker position is disclosed (e.g. refer to Patent document 3).

However, when the device is installed in a seat of an airplane or the like, it is required to reduce the size and weight of the seat and also to improve the reclining function for enhancing the using convenience, resulting in considerable change in posture of the user in the seat, and it makes the environment very severe for the installation of the noise reduction device at the seat. Particularly, in the method conventionally disclosed with respect to the arrangement of speakers at the seat, the regions where speakers can be arranged are limited, and therefore, a speaker held in a large cabinet cannot be installed. Accordingly, the speaker capacity is limited, and there arises a problem of sound quality such as frequency characteristics. Also, the function is not enough to correct the speaker position with respect to posture change in the seat because of the difference in user's height and the reclining function, and there is a problem that it is difficult to realize effective reduction of noise at the user.

Patent document 1 Unexamined Japanese Patent Publication H10-143166

Patent document 2 Unexamined Japanese Utility Model Publication H5-50495

Patent document 3 Unexamined Japanese Patent Publication 2006-166281

SUMMARY OF THE INVENTION

The noise reduction device of the present invention comprises a noise detector for detecting noise generated from noise sources, a noise controller which produces control sound signal for eliminating the noise detected by the noise detector, and a control sound output unit for outputting a control sound based on the control sound signal from the noise controller, which is a noise reduction device disposed in a seat surrounded by a shell portion having a cavity, wherein the control sound output unit is built in the cavity of the shell portion.

Due to such a configuration, the cavity of the shell portion at the seat can be used as a cabinet for the control sound output unit (speaker), making it possible to increase the volume of the cabinet. As is obvious to the person in charge of the work, a speaker having a larger cabinet is higher in capacity of reproducing low-frequency sound and less in reproduction delay of low-frequency sound, and it is possible to enhance the noise reduction effect in low frequency ranges. Also, the holding strength of the control sound output unit can be enhanced. Further, comparing with such a case that the control sound output unit is built into the back of a chair in the seat, it brings about the following advantages. Firstly, the volume of the cabinet can be increased, increasing the capacity of reproducing low-frequency sound and lessening the reproduction delay of low-frequency sound, and thereby, it is possible to enhance the noise reduction effect in low frequency ranges. Secondly, the shell portion as compared with a chair is less in regulation of the airplane, and easier to install the control sound output unit. Thirdly, it can be installed irrespective of comfortability of the chair and can be individually changed in shape or specification, giving rise to increase of the design freedom.

Accordingly, it is possible to provide a noise reduction device which can be installed in the seat of an airplane or the like and assures excellent efficiency, quality, and comfortability.

BRIEF DESCRIPTION OF THE DRAWINGS

FIG. 7 is a plan view showing an installation example of a noise reduction device in the preferred embodiment.

DESCRIPTION OF REFERENCE MARKS

Figure 1:
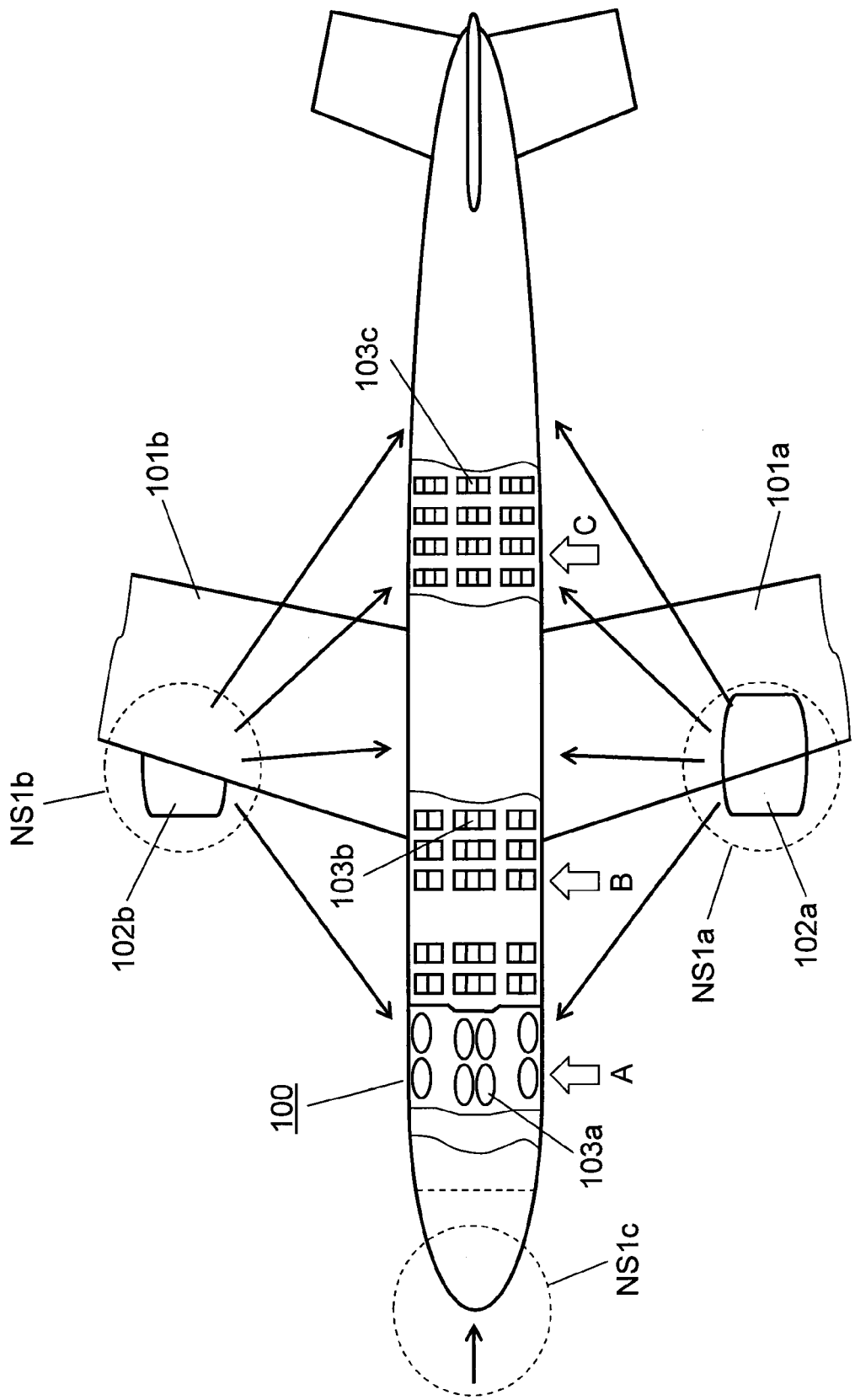
FIG. 1 is a plan view showing the installation environment of a noise reduction device in the preferred embodiment of the present invention.

100 Airplane
100a, A, B, C Cabin
101a, 101b Wing
102a, 102b Engine
103a, 103b, 103c Passenger seat array
104 System control device
300, 400 Noise reduction device
301, 401, 501, 601 User
301b, 501b, 601b Ear
310, NS1a, NS1b, NS1c, NS2a, NS2b Noise source
310N, 340N, NS51 to NS58 Main noise passage (noise route)
320 Noise detector (microphone)
330, 430 Noise controller
331, 335 A/D converter
332 Digital filter
333 Filter renewing unit
334 D/A converter
340 Control sound generator (speaker)
350 Error detector (error microphone)
401a, 501a, 601a Head
402, 502, 602 Seat
402a, 502a, 602a Shell portion
402b, 502b, 602b Reclining portion (seat portion)
420ba, 502ba, 602ba Stool portion
402bb, 502bb, 602bb Back-rest
402bc, 502bc, 602bc Head-rest
420a, 420b, 450a, 450b, 520a to 520l Microphone
440a, 440b, 440c, 440d, 540a, 540b, 640, 640a, 640b, 640c, 640d Speaker
502bd, 502be Elbow-rest
503, 503a, 503b, 603 Speaker holder
504, 504a, 504b, 604 Slide portion
α Spreading angle

PREFERRED EMBODIMENTS FOR CARRYING OUT THE INVENTION

The preferred embodiments of the present invention will be described in the following with reference to FIG. 1 to FIG. 8.

Preferred Embodiment

Regarding the noise reduction device in the preferred embodiment of the present invention, an example of installing the device in an airplane is described in the following.

First, sound environment in an airplane required to be provided with a noise reduction device is described with reference to FIG. 1 and FIG. 2.

FIG. 1 is a plan view showing the installation environment of the noise reduction device in the preferred embodiment of the present invention. As shown in FIG. 1, airplane 100 comprises engines 102a, 102b mounted in the right and left wings.

From the viewpoint of sound environment of the airplane, not only rotating sound but also echoes due to air current are generated from the engine during flying. Therefore, the engine occupies an important position as a noise source. From the viewpoint of passenger services, engines 102a, 102b act upon each part of the airplane body as external noise sources NS1a, NS1b, for example, with respect to seat arrays 103a, 103b, 103c disposed in cabin A (e.g. first class), cabin B (e.g. business class), and cabin C (e.g. economy class), and also, bumping sound (air cutting noise) generated by the air current bumping against the end portions or both wings of the airplane as the airplane body moves through the air at a high speed serves as noise source NS1c and gives bad influences to information services or the like in the airplane.

Figure 2:
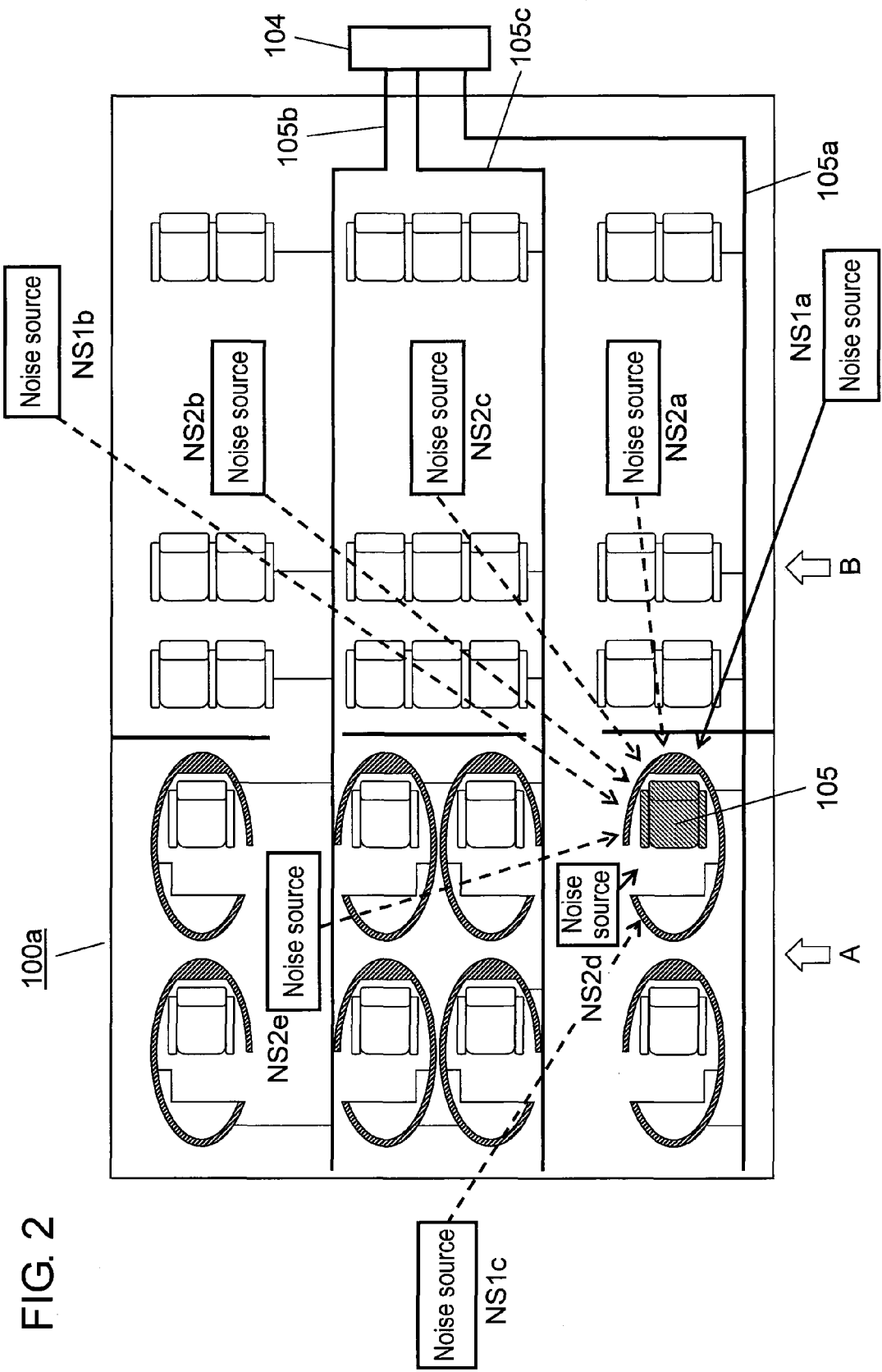
FIG. 2 is a plan view showing the detail of installation environment of a noise reduction device in the preferred embodiment.

FIG. 2 is a plan view showing the detail of installation environment of the noise reduction device, in which the arrangement of seats in cabin A and cabin B shown in FIG. 1 is partially enlarged. Cabin 100a is divided into cabin A and cabin B by using a wall, and seat arrays are disposed in cabin A and cabin B respectively. Also, each seat array is furnished with hearing equipment and connected to system control device 104 provided with a switching device and data control server via communication lines 105a, 105b, 105c such as Internet (registered mark). On the other hand, as to the sound environment of cabin 100a, there exist external noise sources such as noise sources NS1a, NSs1b generated from engines 102a, 102b and air cutting noise NS1c generated at end portions of the airplane body, and in addition, noise sources NS2a to NS2e due to air conditioners or the like exist as internal noise sources. When such noise is considered as noise at one seat 105 disposed in cabin A, then seat 105 is subjected to the influences of noise from noise sources NS1a to NS1c generated by engine 102a (FIG. 1) installed in the wing outside the window and caused due to air current noise, and noise sources NS2a to NS2e generated from air conditioners. For example, at seat 105 in cabin A, it can be predicted that noise from noise source NS1a due to the engine mounted in the left wing (FIG. 1) is strongest out of noises coming from noise sources NS1a to NS1c and noise sources NS2a to NS2e. Accordingly, in order to realize effective reduction of noise at each seat, out of noises emitted in various directions, it is necessary to take the measure mainly for noise that is strongest to the user sitting in the seat and gives bad influence to the sound environment of the seat.

Particularly, in the first class shown by cabin A in FIG. 1, the seat has a shell structure surrounding the reclining portion from the back, and the shell is internally furnished with audio-video equipment such as television and radio to be used for enjoying movies or music, a working desk, power outlet for PC connection, etc. Thus, it is strongly required for providing such an environment that the user is able to relax in the seat or concentrate on business work. Therefore, the request for elimination of noise in the shell is especially very strong, and the material used for the shell itself has a sound insulation effect, but it is important to efficiently reduce noise existing around the shell or coming through the shell.

The basic configuration of the noise reduction device will be described in the following with reference to FIG. 3A, B.

Figure 3B:
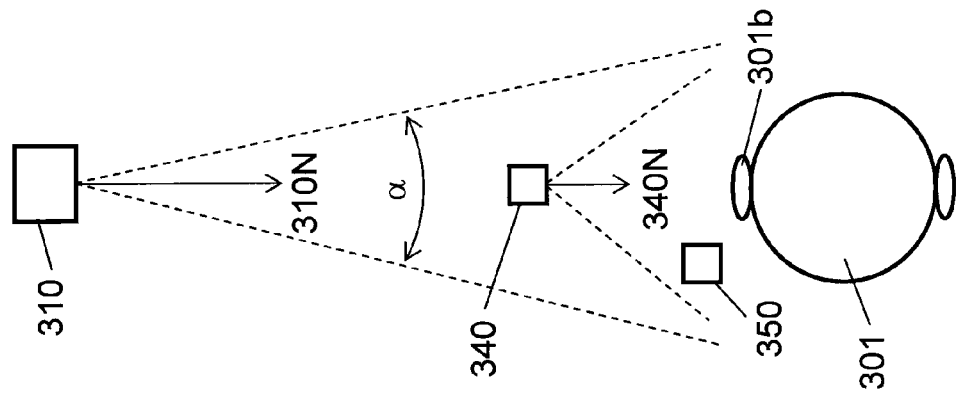
FIG. 3B shows a method of superimposing the noise emitted from a noise source on the control sound output from a speaker of the noise reduction device in the preferred embodiment.
Figure 3A:
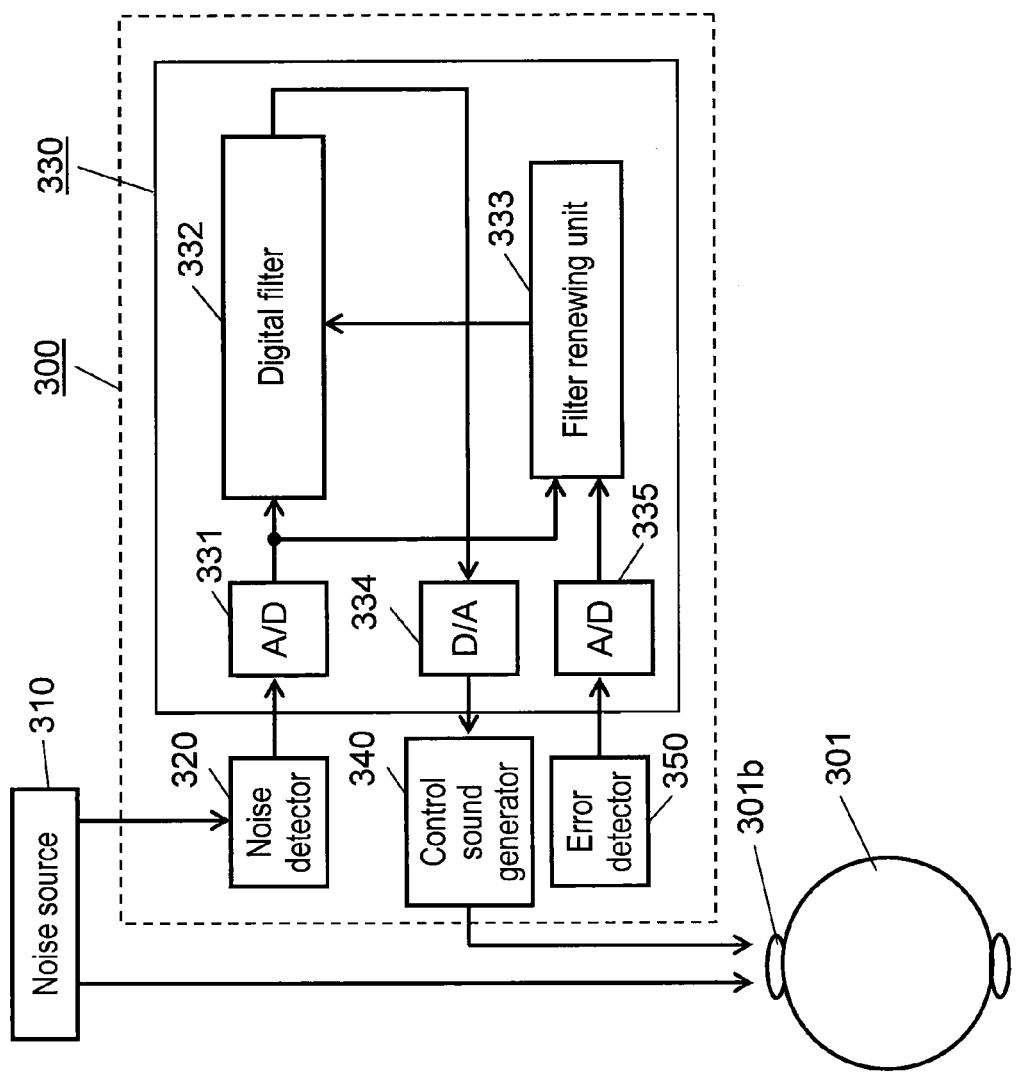
FIG. 3A is a block diagram showing the basic configuration of a noise reduction device in the preferred embodiment.

FIG. 3A is a block diagram showing the basic configuration of the noise reduction device in the preferred embodiment of the present invention.

Noise reduction device 300 comprises noise detector 320, noise controller 330, control sound generator 340, and error detector 350. The configuration and the function are described in the following.

Noise detector 320 is disposed as a noise detecting unit for detecting noise emitted from noise source 310, which is a microphone (hereinafter referred to as microphone) having a function to detect noise information, convert it to electric signal, and output.

Noise controller 330 as a noise control unit comprises A/D converter 331, 335, digital filter 332, filter renewing unit 333, and D/A converter 334, which produces control sound signal for controlling the control sound generator 340 in order to minimize the detection error in accordance with noise information from microphone 320 that is a noise detecting unit and error information from error detector 350.

A/D converter 331 executes A/D conversion of noise signal from microphone 320 and outputs the signal to digital filter 332 and filter renewing unit 333. Digital filter 332 is formed of multi-stage taps, which is an FIR filter capable of freely setting the filter coefficient of each tap. The detection error information from error detector 350 in addition to the information from microphone 320 is inputted to filter renewing unit 333 via A/D converter 335, and each filter coefficient of digital filter 332 is adjusted so that the detection error is minimized. That is, control sound signal so as to become opposite in phase is superimposed on the noise from noise source 310 at the installation position of error detector 350, and it is outputted to the control sound generator via D/A converter 334. Control sound generator 340 is a speaker as control sound output unit, which is capable of converting the control sound signal received from D/A converter 334 to sound waves and emitting the output, having a function of emitting control sound that offsets the noise in the vicinity of ear 301b of user 301.

Error detector 350 detects the sound after noise reduction as an error, and executes the feedback with respect to the operational result of noise reduction device 300. In this way, it is possible to minimize the noise at the ear position of the user at all times even when the noise environment changes.

As shown in FIG. 3A, in noise reduction device 300 in the preferred embodiment of the present invention, noise emitted from noise source 310 is detected by microphone 320, and the signal is processed by noise controller 330 to output a control sound from speaker 340, then the noise emitted from noise source 310 is combined with phase-reversed sound and transmitted to ear 301b of user 301, thereby reducing the noise.

FIG. 3B illustrates a method of combining the control sound outputted from speaker 340 with the noise emitted from noise source 310.

When the noise spreading angle is α with respect to main noise passage 310N that connects noise source 310 to ear 301b of user 301, speaker 340 is arranged within spreading angle α. In this way, the phase-reversed control sound emitted from speaker 340 is combined with the noise before reaching ear 301b of user 301. Also, since error microphone 350 is arranged as an error detector within the combining region, sound after noise reduction is detected as an error, and it is subjected to feedback with respect to the operational result of noise reduction device 300, and thereby, the noise reduction effect can be enhanced.

Here, in noise reduction device 310, during the time until noise reaches control point (ear 301b) after being detected by microphone 320, it is necessary to reproduce control sound from speaker 340 by processing the signal in noise controller 330. In this case, if the speaker is small in volume of the cabinet, response is delayed due to phase delay in low frequency range, and the control sound will not be reproduced in time, and sufficient noise reduction cannot be obtained in low frequency range. In the case of a noise reduction device in the present preferred embodiment, as described later, the cavity of the shell portion of the seat can be largely used as a cabinet of the speaker, and phase delay in low frequency range is lessened and processing time required for control sound reproduction is shortened, and it is possible to obtain sufficient noise reduction effect even in low frequency range.

A configuration example in the case of installing the noise reduction device in a seat will be described in the following.

Figure 4B:
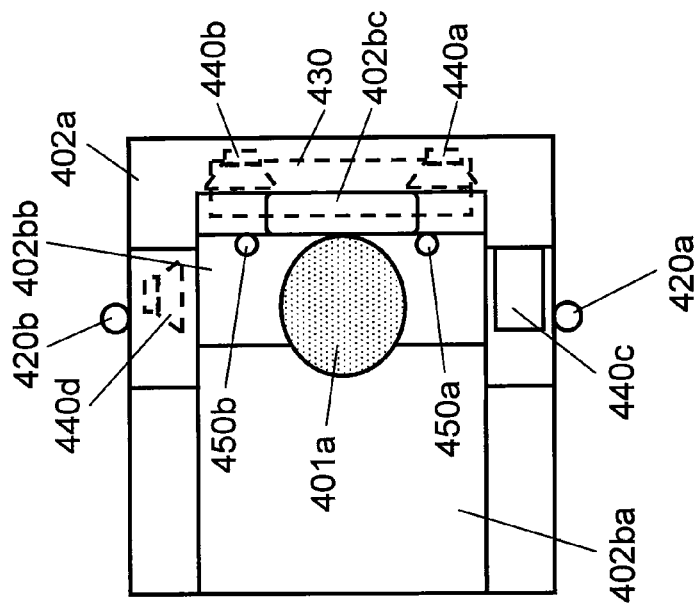
FIG. 4B is a plan view showing an installation example of a noise reduction device in the preferred embodiment.
Figure 4A:
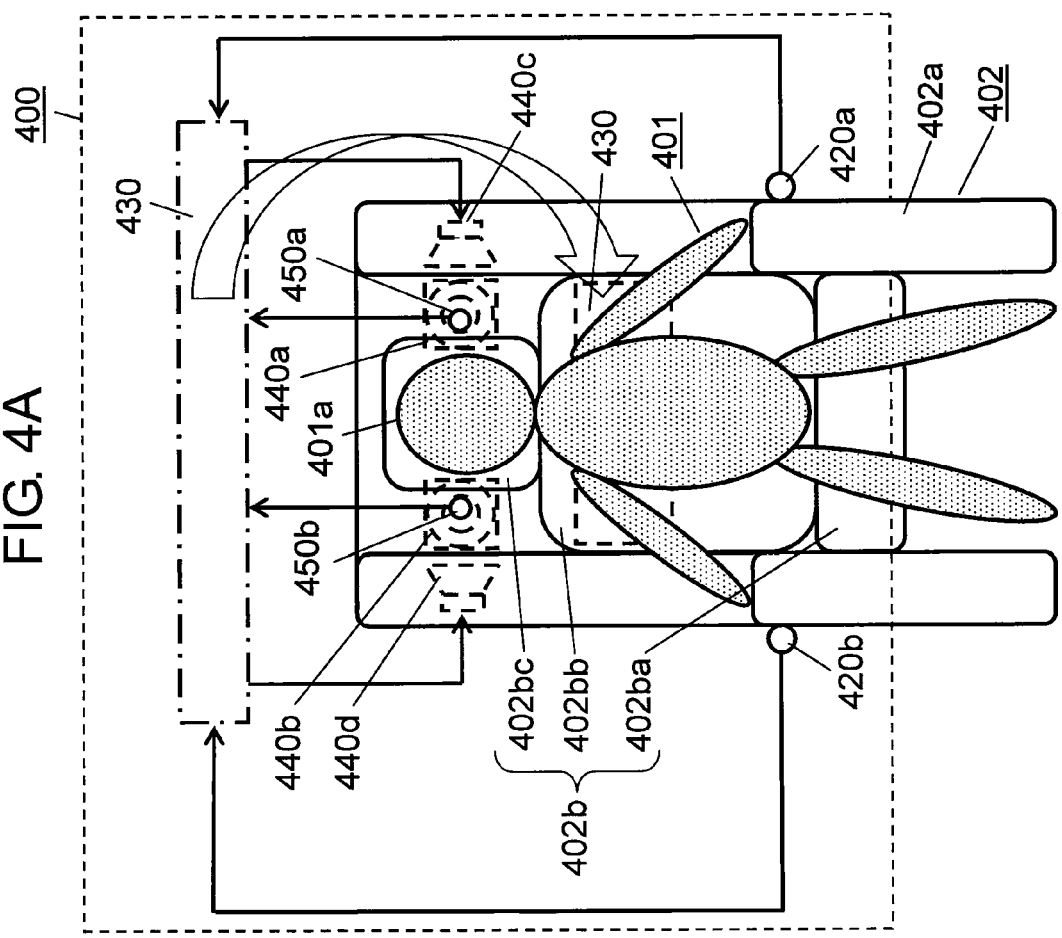
FIG. 4A is a front view showing an installation example of a noise reduction device in the preferred embodiment.

FIG. 4A, B are a front view and a plan view showing an example of installing the noise reduction device in the preferred embodiment of the present invention in a seat of an airplane.

Noise reduction device 400 is installed in seat 402, and seat 402 has a shell structure having a reclining function. Seat 402 comprises shell portion 402a and reclining portion 402b. Shell portion 402a holds reclining portion 402b as a base to secure the seat. Also, reclining portion 402b comprises stool portion 402ba, back-rest 402b and head-rest 402bc. Stool portion 402ba, back-rest 402bb, and head-rest 402bc are engaged with each other, which are movably supported by shell portion 402a and capable of displaying a reclining function. Shell portion 402a is peripherally furnished with microphones 420a, 420b (corresponding to noise detector 320 of FIG. 3A), and also, the portion that covers head-rest 402bc has a C-shape so that head 401a of user 401 sitting in seat 402 is surrounded by shell portion 402a. Also, shell portion 402a is furnished with noise controller 430 (corresponding to noise controller 330 of FIG. 3A) and speakers 440a to 440d (corresponding to control sound generator 340 of FIG. 3) at the back thereof, and speakers 440a, 440b are arranged at the back close to the ears of user 401, and speakers 440c, 440d are disposed at the either side opposing to the ears. Also, microphones 450a, 450b (corresponding to error detector 350 of FIG. 3A) as error detectors are arranged between head 401a and speakers 440a to 440d respectively.

Figure 5:
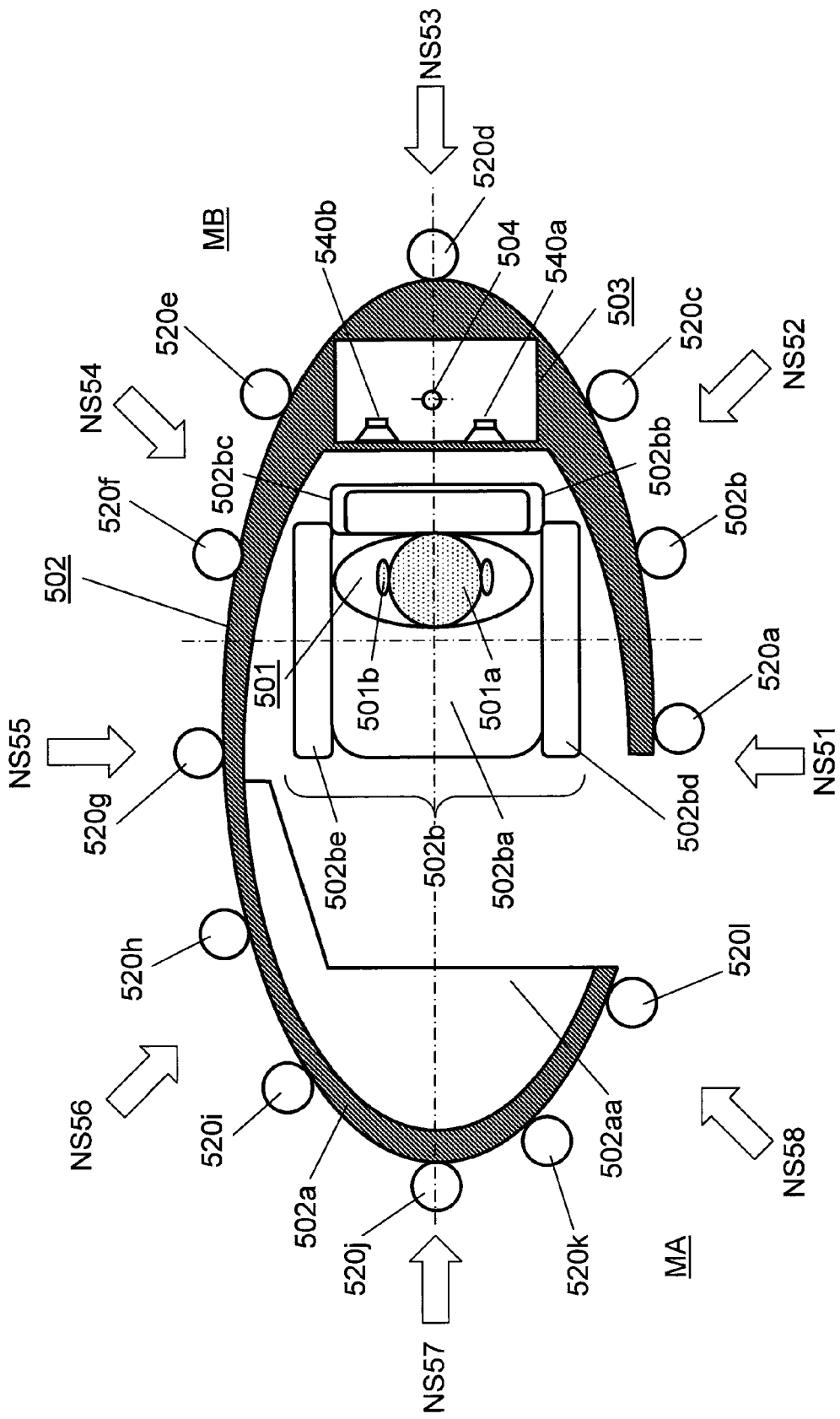
FIG. 5 is a plan view showing an installation example of a noise reduction device in the preferred embodiment.

The feature of a configuration in which the noise reduction device in the preferred embodiment of the present invention is installed in a cabin of an airplane is described in the following with reference to FIG. 5. FIG. 5 is a plan view showing the main configuration in the example of noise reduction device installed in a cabin of an airplane in the preferred embodiment of the present invention.

As shown in FIG. 5, noise reduction device 400 in the preferred embodiment of the present invention is installed in seat 502 arranged in cabin A (FIG. 1) of an airplane.

Seat 502 is disposed inside shell portion 502a surrounding the seat 502 in a shell-like fashion by its wall surface, maintaining the region occupied by the user, and comprises reclining portion (seat portion) 502b which is arranged in shell portion 502a and can be reclined. Shell portion 502a is provided with shelf portion 502aa opposing in the forward direction to reclining portion 502b and may display a function as a desk. Also, reclining portion 502b comprises stool portion 502ba, back-rest 502bb, head-rest 502bc, and elbow-rest 502bd, 502be. When the user makes the reclining operation, stool portion 502ba is reclined forward, changing the tilt angle of back-rest 502bb engaging with stool portion 502ba, and head-rest 502bc can be mainly moved in the downward direction.

As sound environment in cabin A of an airplane, there are noise sources such as engines mounted in the airplane body, air conditioners installed in the cabin, and the like. At seat 502, noise emitted from noise sources for example reaches the outer periphery of shell portion 502a mainly through main noise passage (noise route) NS51 to NS58 connecting each noise source to seat 502. On the other hand, at the outer periphery of shell portion 502a of seat 502, as a structural element of the noise reduction device in the preferred embodiment of the present invention, for example, there are provided microphones 520a to 520l (corresponding to noise detector 320 of FIG. 3A) for noise detection.

Also, shell portion 502a internally has a cavity at a position opposite to the back of reclining portion 502b, and speaker holder 503 as a speaker mounting member is disposed in the cavity. Speaker holder 503 is provided with speaker 540a and speaker 540b (corresponding to control sound generator 340 of FIG. 3A) as control sound output unit in noise reduction device 400. Speaker in the present invention is a cone-shaped speaker as shown in FIG. 5, which is formed with a voice coil around a permanent magnet and generates sound by applying an electric current to the voice coil to vibrate an oscillation plate. As a speaker, it is allowable to use the one without such a voice coil, and the shape is not limited to a cone-like shape. However, the low frequency characteristic is poor in use of only a speaker, it is usually housed in a box-like speaker holder which resonates the sound with the back of the speaker closed. The shell portion is greatly bulged at the back so that a large-volume speaker holder 503 can be formed. Further, speaker holder 503 is arranged close to and nearly parallel to head-rest 502bc of reclining portion 502b and is movably configured. In addition, speaker 540a and speaker 540b can be arranged nearly at the height of the ear of user 501. FIG. 5 shows an example of disposing speakers 540a, 540b at either side of ear 501b in such a configuration that speaker holder 503 is formed like a flat plate and positioned near the back of ear 501b at head 501a of user 501. Speaker holder 503 is held by slide portion 504 having a screw feeding mechanism so that it is movable nearly up and down.

In this configuration, shell portion 502a and speaker holder 503 of seat 502 can be used as the cabinet of speaker 540a and speaker 540b. In this way, the space can be increased for speakers 540a and 540b in a limited space. As a result, the cabinet volume can be enlarged, enhancing the low frequency reproduction capacity of speaker 540a and 540b and lessening the delay in low frequency reproduction, and it is possible to enhance the noise reduction effect in the low frequency range. Further, the strength of the structure for holding speaker 540a and speaker 540b can be increased. Accordingly, it is possible to realize a noise reduction device which can be installed in a cabinet of an airplane or train and ensures high quality and excellent comfortabiity, offering a high-quality low-noise sound environment to the user improving the comfortability of the airplane and the like. Also, the internal cavity of shell portion 502 is allowable to be formed over the entire periphery of shell portion 502 as well as at the back, and in this way, the volume of the cavity or the volume of the cabinet can be further increased, and it is possible to further improve the acoustic characteristic of control sound output.

An application example of a noise reduction device that is a structural feature in the preferred embodiment of the present invention will be described in the following with reference to FIG. 6A to D.

FIG. 6A to D are side views and partly sectional views showing main configuration of an application example of seat 602 in which noise reduction device 400 in the preferred embodiment of the present invention is installed.

Figure 6A:
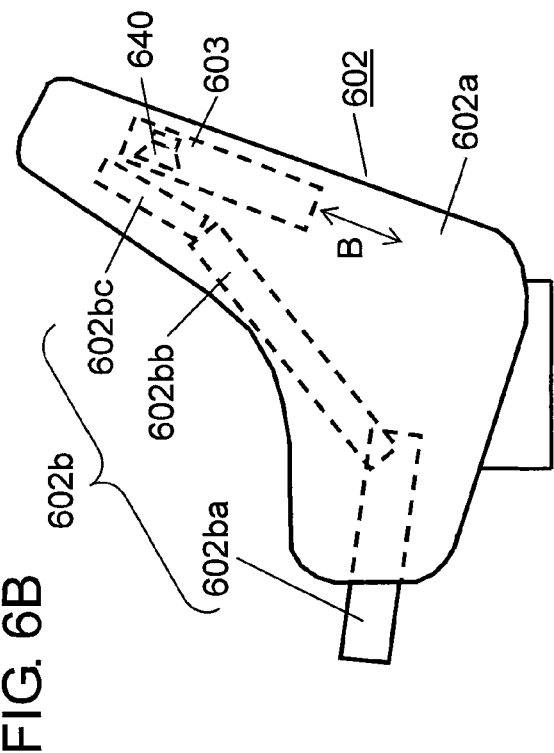
FIG. 6A shows an application example of a noise reduction device in the preferred embodiment, which is a side view related to a seat showing the positional relation between shell portion and reclining portion when the user is in the standard posture (without reclining the seat) at the seat.
Figure 6B:
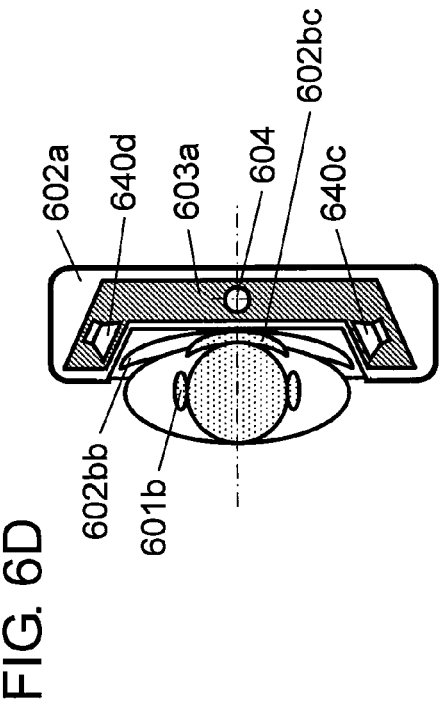
FIG. 6B shows an application example of a noise reduction device in the preferred embodiment, which is a side view showing the positional relation when the reclining portion is fully shifted down.
Figure 6C:
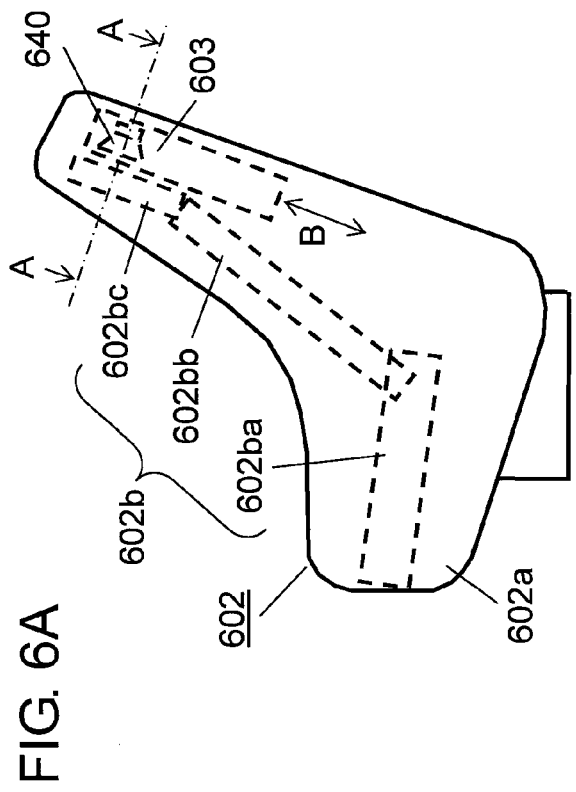
FIG. 6C is a sectional view along the arrow A in FIG. 6A, showing an example related to the using environment of the noise reduction device with respect to the user sitting in the seat.
Figure 6D:
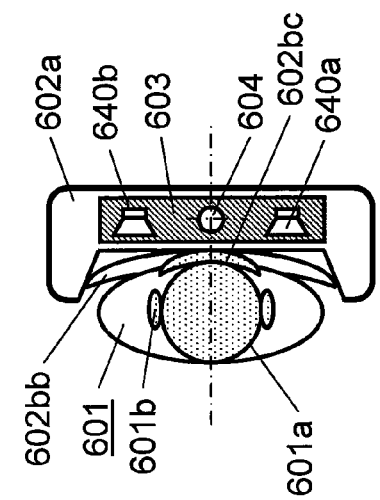
FIG. 6D is another application example of the structure shown in FIG. 6C.

FIG. 6A is a side view related to seat 602, showing the positional relation between shell portion 602a and reclining portion 602b when the user is sitting in the standard posture (without reclining the seat) at seat 602 having a reclining function. Similarly, FIG. 6B is a side view showing the positional relation when the seat is fully reclined. Also, FIG. 6C is a sectional view in the direction of arrow A in FIG. 6A, showing an example related to the using environment of noise reduction device 400 with respect to user 601 sitting in seat 602. FIG. 6D shows another application example of the structure shown in FIG. 6C.

First, seat 602 comprises shell portion 602a and reclining portion 602b as a base, and reclining portion 602b is movably held by shell portion 602a. Reclining portion 602b comprises stool portion 602ba, back-rest 602bb, and head-rest 602bc. Stool portion 602ba, back-rest 602bb, and head-rest 602bc are engaged with each other and movably held in shell portion 602a. Due to this configuration, seat 602 can be reclined by manipulating the operation lever (not shown). Accordingly, the back of seat 602 is covered with shell portion 602a, and the seat can be reclined by sliding the reclining portion 602b forward, and it is possible to keep constant the space occupied by each seat without giving influence to the space of the adjacent seat at the back in reclining operation.

Next, inside the shell portion 602a, speaker holder 603 is disposed as a speaker mounting member at the back of reclining portion 602b, and speaker holder 603 is provided with speaker 640 (corresponding to control sound generator 340 of FIG. 3A) as a control sound generator in noise reduction device 400. Also, speaker holder 603 is arranged close to and nearly parallel to head-rest 602bc of reclining portion 602b, which is configured so as to be movable, and also, speaker 640 can be disposed nearly at the ear height of user 601.

FIG. 6B shows the positional relation between reclining portion 602b and shell portion 602a when the seat is reclined by the user and reclining portion 602b is tilted at the predetermined angle. In this case, stool portion 602ba is protruded forward of the seat, back-rest 602bb is changed in tilt angle, and head-rest 602bc is lowered in height and moved to a lower position inside the shell portion 602a. On the other hand, speaker holder 603 moves in the direction B (nearly up and down) along with the vertical movement of head-rest 602bc, so that the positional relation between user's ear 601b and speaker 640 in the direction of height can be kept nearly constant. In the above description, reclining portion 602b is tilted at the predetermined angle, but even in case of reclining to a full-flat state where the user's body is nearly horizontal, it can also be configured so that speaker 640 may follow the ear height of user 601.

FIG. 6C shows an example of installing speakers 640a, 640b at either side of head-rest 602bc where speaker holder 603 is structurally plate-like and positioned close to the back of ear 601b at head 601a of user 601. Speaker holder 603 is movably held nearly in the vertical direction by slide portion 604 having a screw feeding mechanism or the like.

FIG. 6D shows an example of installing speakers 640c, 640d at either side of ear 601b at head 601a of user 601 where speaker holder 603a is structurally nearly C-shaped.

Regarding the height adjustment of speaker 640, the speaker 640 is first adjusted to a position best for user 601 by the initial setting operation for using it, and then the standard position is set for speaker 640 in noise reduction device 400. After that, the amount of movement of head-rest 602bc interlocked with the reclining operation is detected by a sensor (not shown), and speaker holder 603 is moved in the same direction by the detected amount of movement, thereby adjusting the height of speaker 640.

Speaker 640 can also be arranged not inside the shell portion 602 but inside the head-rest 602bc of reclining portion 602b. Also, in the case of a chair having no reclining function, the speaker can be disposed in the back portion of the chair. As in noise detection device 400 in the preferred embodiment, when speaker 640 is not housed in the chair (reclining portion) but in shell portion 602, it brings about the following advantages.

Firstly, the cabinet volume can be increased, and the processing speed of low frequency range becomes higher. Secondly, shell portion 602 is less subjected to regulation (restriction) of an airplane as compared with a chair (reclining portion) and it is easier to install speaker 640. Thirdly, it can be installed irrespective of the sitting comfortability of chair (reclining portion) (when a large speaker is installed on a chair, it is necessary to change the design and the sitting comfortability is affected). Finally, the shape and specification can be changed independently of the chair (reclining portion), giving rise to the design freedom.

As described above, using the noise reduction device in the preferred embodiment of the present invention, the shell portion of the seat can be used as a cabinet for control sound output unit, and the cabinet volume can be increased in a limited space. Accordingly, it becomes possible to improve the acoustic characteristic of the control sound output and to realize efficient reduction of noise. Further, it is possible to strengthen the holding structure of the control sound output unit.

Also, the position of the control sound output unit can be corrected and optimized coping with difference in height of the user and change in posture at the seat due to reclining operation. Accordingly, noise reduction can be effectively realized for the user.

As a result, in the cabin of an airplane or train, it is possible to provide an effective and high-quality low-noise environment to the user and to improve the comfortability.

In the preferred embodiment of the present invention, speaker holder 603 moves nearly in the vertical direction along with the movement of head-rest 602bc, and the positional relation between ear 601b of the user and the height of speaker 640 is kept constant in the description. However, the movement of speaker holder 603 is not limited to the vertical direction. For example, even in case the reclining angle is constant or the user in the seat changes his or her facing direction, it is allowable to move the speaker holder in the forward, backward, right or left direction to follow the movement. In that case, it is allowable to automatically recognize the ear position by using an image sensor or the like and to move speaker holder 603 in accordance with the result of the recognition.

Also, in the preferred embodiment of the present invention, engine is supposed to be main noise source, but noise source is not limited to this. Besides noise of equipment for generating thrust of an airplane such propellers and engines in particular, complicatedly superimposed noise from many noise sources existing in the installation environment comes to the seat such as air cutting noise during flying, noise related to air current generated along with the movement of the airplane in the air, noise generated by air conditioning systems such as air conditioners, voice related to information service in the cabin, and indirect noise reflected from wall surfaces.

Also, the preferred embodiment of the present invention, as shown in FIG. 3A, B, comprises error detector (error microphone) 350 for detecting control sound outputted from control sound generator (speaker) 340 in addition to noise detector (microphone) 320 as a noise detecting unit for detecting noise emitted from noise source 310, wherein the error of control sound can be corrected by detecting the synthetic sound of noise and control sound by means of error microphone 350. However, error microphone 350 is not an essential component element for the noise reduction device in the preferred embodiment of the present invention. Since error microphone 350 is usually disposed in the vicinity of the head of the user, the seat configuration near the user's head can be simplified by omitting error microphone 350. Accordingly, it is possible to realize a comfortable and low-cost noise reduction device which hardly gives mental pressure to the user.

Also, in the preferred embodiment of the present invention, shell portion 502a is described as an oval structure (FIG. 5) which surrounds reclining portion 502b from backward. However, any shape is allowable provided that the structure is able to partition the space between adjacent seats and has an opening for the user to get in and out of the seat. For example, it is allowable to be rectangular or semi-circular to cover only the back portion.

Also, in the preferred embodiment of the present invention, speaker holder 503 is arranged in the cavity of shell portion 502a (FIG. 5) in the description. However, depending upon the shape of shell portion 502a, it is sometimes difficult to obtain a cavity having a sufficient capacity or sometimes desirable to install the speaker holder in other place. In that case, as shown in FIG. 7, it is allowable to obtain a space for speaker holder 503a and 503b by partially expanding the outer periphery of the back of shell portion 502a. Naturally, when expanded, it is not limited to FIG. 7, and it is allowable to expand the inner periphery of shell portion 502a. Also in this case, same as in FIG. 5, speaker 540a and speaker 540b can be respectively moved nearly in the vertical direction by slide portion 504a and slide portion 504b.

INDUSTRIAL APPLICABILITY

The noise reduction device of the present invention is capable of providing a high-quality noise reduction device. Accordingly, the noise reduction device is effective to be used in spaces as in airplanes, trains, cars, etc. where noise is generated.

The invention claimed is:

1. A noise reduction device comprising:
a noise detecting unit detecting noise emitted from noise sources;
a noise control unit for generating a control sound signal to reduce noise detected by the noise detecting unit; and
a control sound output unit for outputting a control sound based on the control sound signal from the noise control unit, wherein
the noise reduction device is arranged at at least one of a plurality of seats;
each of the plurality seats includes a seat portion having a headrest and a shell portion surrounding the seat portion by its wall surface;
the shell portion includes a bulged section having a width in a direction that a passenger sits at the seat portion,
the bulged section is located behind the seat portion and has a cavity at a position opposed to the headrest of the seat portion;
the control sound output unit is installed in the cavity of the shell portion; and
the cavity is used for a sound space and integrated into the shell portion.

2. The noise reduction device of claim 1,
the noise reduction device comprising a plurality of noise detecting units,
wherein at least one of the plurality of noise detecting units is arranged at the shell portion.

3. The noise reduction device of claim 2,
the noise reduction device comprising a plurality of control sound output units,
wherein more than one control sound output unit are installed in the cavity.

4. The noise reduction device of claim 2,
wherein the shell portion includes a plurality of corner portions; and
each of the plurality of corner portions includes curved surface shape.

5. The noise reduction device of claim 4,
wherein the shell portion shape is egg-shaped.

6. The noise reduction device of claim 1,
wherein the control sound output unit is movably arranged in the cavity of the shell portion.

7. The noise reduction device of claim 1,
wherein the seat portion has a reclining portion, and the control sound output unit moves in the cavity of the shell portions, interlocking with the reclining portion.

8. The noise reduction device of claim 1,
wherein the seat portion has a reclining portion and the reclining portion is arranged at an angle of predetermined.

9. The noise reduction device of claim 1,
wherein the seat portion has a reclining portion and the bulged section is at a position opposite to the back of the reclining portion.

* * * * *